TELEGRAPH COMMUNICATION SYSTEMS WITH CARRIER MONITORING

Filed April 28, 1959

INVENTORS.
RICHARD E. GRAY
GEORGE Q. Mc COLL
BY Alfred C. Hill
AGENT

United States Patent Office 2,967,908

Patented Jan. 10, 1961

2,967,908

TELEGRAPH COMMUNICATION SYSTEMS WITH CARRIER MONITORING

Richard E. Gray, New York, and George Q. McColl, Brooklyn, N.Y., assignors to International Telephone and Telegraph Corporation, Nutley, N.J., a corporation of Maryland Filed Apr. 28, 1959, Ser. No. 809,376

20 Claims. (Cl. 178—69)

Figure 1:
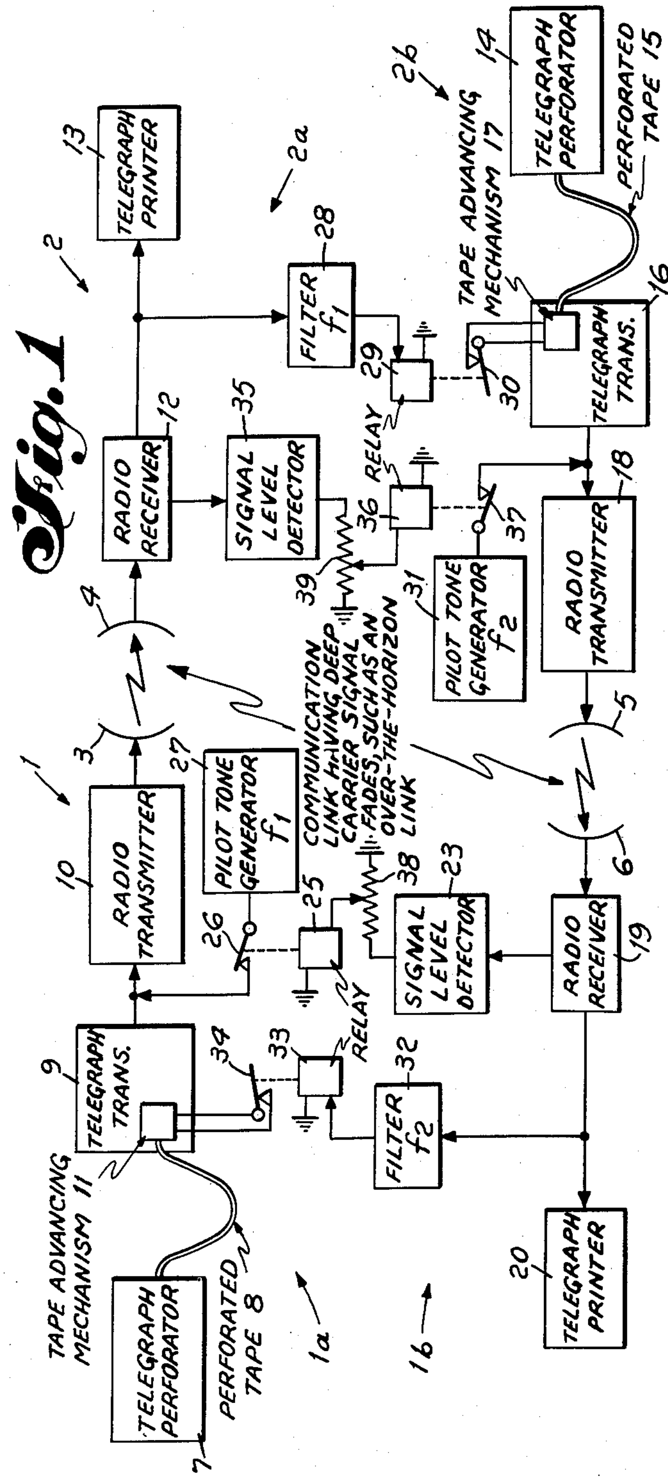

This invention relates to telegraph communication systems and more particularly to an improved telegraph error-reducing arrangement for such systems.

The maximum error rates now acceptable on telegraph service, such as Teletype service, is about two errors per hour. On the basis of sixty words per minute and five characters per word the acceptable maximum error rate is one error in every ten thousand characters. Certain telegraph systems, particularly radio telegraph systems of the over-the-horizon type, have deep fades, that is a reduction of carrier signal level for an appreciable amount of time. In such systems, it is difficult to meet the required low error rates without resorting to special auxiliary equipment or to increased radiated power. It has been found that a one-second carrier signal fade below receiver threshold represents about five errors in a telegraph system. It has been noted that on certain telegraph systems utilizing radio communication between remote points there are present about two hundred errors per hour which obviously is much above the maximum acceptable error rate.

The term "receiver threshold" employed herein refers to that carrier signal level applied at the input to the receiver above which the signal-to-noise ratio is sufficient to enable detection of the carrier signal for the recovery of the intelligence carried thereon and below which the signal-to-noise ratio is insufficient to enable the detection of the carrier signal for recovery of the intelligence thereon.

The errors produced by the deep fades of the carrier signal level on a radio telegraph system can be overcome by increasing the level of the carrier signal so that the deepest carrier signal fades will be above the receiver threshold. In certain radio systems this may be accomplished without too much increase in cost. However, on radio systems, such as over-the-horizon or forward scatter communication systems, an increase in power above the usually employed several kilowatts of power represents an extremely costly way of overcoming the errors produced by the carrier signal fades. The increase in received carrier level might be obtained by increasing the already relatively large power output of the transmitter or by increasing the area of the large antennas normally used to receive and transmit the communication signals or both.

An alternative solution to reduce the errors present on a radio telegraph system has been proposed and has become known as an error-correcting system. This system briefly includes equipment at the transmitter to convert the normal five-position telegraph code to a seven-position code which always contains three marks and four spaces. The three marks and four spaces are arranged in a cryptographic manner to convey the intelligence. The receiver of this error-correcting system includes equipment to detect the presence of the three marks and four spaces regardless of their cryptographic order. If the three marks and four spaces are not present this indicates the presence of an error and the receiver equipment will send back to the transmitter a request to repeat the message during that portion of the message where an error was indicated. While this is an acceptable method of reducing errors in a radio telegraph system, it is also a relatively costly system. Likewise the error-correcting equipment described above and other such systems are not foolproof, since noise and fading can produce the desired combination of three marks and four spaces and hence the equipment will not be able to detect an error which actually has occurred.

An object of this invention is to provide an improved telegraph error reducing system.

Another object of this invention is to provide a telegraph error reducing system which is relatively inexpensive.

Still another object of this invention is to provide a telegraph error reducing system which will reduce telegraph errors to the maximum acceptable error rate without resorting to equipment changes to increase transmittal power, or the addition of expensive telegraph error detection equipment.

A further object of this invention is to provide a telegraph error reducing system including a minimum number of components operable in cooperative relationship with standard radio telegraph components to prevent the transmission of telegraph signals during periods of carrier signal fades below the receiver threshold.

A feature of this invention is to provide an arrangement cooperating with a normal radio telegraph system, such as may be employed in an over-the-horizon radio communication system, which will permit the transmission of telegraph signals only when a signal, such as the carrier signal, being received at a remote station is of adequate amplitude, that is, an amplitude above the receiver threshold.

Another feature of this invention is the provision of signal receiving and signal transmitting stations and an arrangement associated therewith including a means disposed in the receiving station responsive to a signal, such as the carrier signal, received from the transmitting station to produce a control signal when the received signal drops below a given amplitude and means responsive to said control signal produced at the signal receiving station to render the transmitting station inoperative during that period of time that said received signal is below said given amplitude.

Still another feature of this invention is to provide a pair of remotely spaced stations, the first of said stations having means for transmitting a telegraph signal toward the second of said stations, said second of said stations having means for receiving said telegraph signals and means for sending a monitoring signal back to said first station, said first station having means responsive to said monitoring signal for maintaining said telegraph transmitting means in operation and for cutting off said telegraph transmitting means in the absence of said monitoring signals.

A further feature of this invention is the provision of a signal or pilot tone generator having a given frequency in the receiving station of a one-way telegraph communication system. The output signal of the signal generator is coupled by a transmission medium to the transmitting station of the one-way telegraph communication system. means are included in the transmitting station to detect the signal of the signal generator and to maintain the telegraph transmitter of the transmitting station in operation for transmission of the telegraph signals to the receiving station as long as the signal of the signal generator is being detected. The carrier signal received at the receiving station from the transmitting station is monitored to determine whether the carrier signal is approaching the receiver threshold or, in other words, whether the carrier signal is at a predetermined level above the receiver threshold. The carrier signal monitor operates to maintain an output from the signal generator application to said transmission medium as long as the carrier signal remains at or above a predetermined amplitude above the receiver threshold but disconnects the signal generator output from said transmission medium as soon as the carrier signal level drops below said predetermined amplitude above the receiver threshold and hence renders said telegraph transmitter inoperative.

Still a further feature of this invention is the provision of a two-way communication telegraph system incorporating the telegraph error reducing system of this invention to substantially prevent telegraph errors in both communication paths. Each communication path of the two-way communication telegraph system includes a signal generator in the receiving station whose output is controlled by a carrier signal level monitor and a means in the transmitting station to disconnect the telegraph transmitter when the signal of said signal generator is absent. In the two-way communication system, the transmission means for the output signal of the signal generator is provided by the transmission equipment in the communication path transmitting in the opposite direction to the communication path which the system of the invention is protecting against telegraph errors. Thus, it is not necessary to provide an extra transmission medium for the output signal of the signal generator, but rather employ the established communication path for this purpose.

Figure 2:
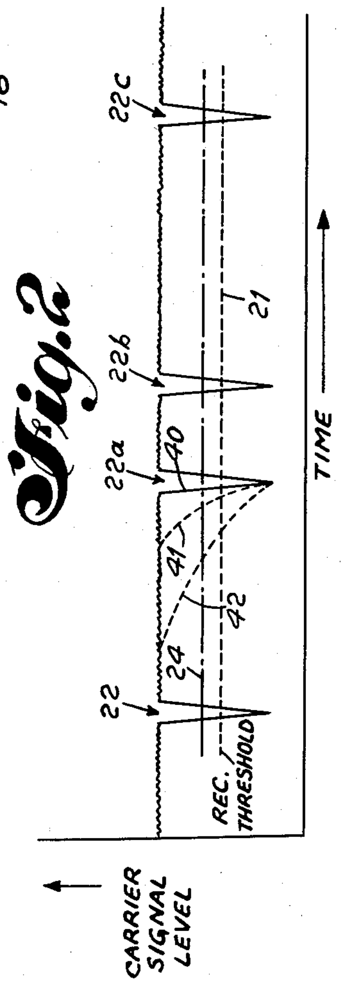

The above-mentioned and other features and objects of this invention will become more apparent by reference to the following description taken in conjunction with the accompanying drawings, in which:

Fig. 1 is a schematic diagram in block form of a radio telegraph communication system employing an embodiment of a telegraph error reducing system in accordance with the principles of this invention; and Fig. 2 is a graphical representation of carrier signal level versus time useful in explaining the operation of the system of Fig. 1.

Referring to Fig. 1, there is illustrated therein a two-way radio telegraph communication system including a first terminal station 1 and a second terminal station 2 interconnected by two communication paths illustrated to be radio communication paths having deep carrier signal fades, such as occurs in an over-the-horizon type communication system. The communication path in the illustration is provided from terminal 1 to terminal 2 by antennas 3 and 4 while the communication path from terminal 2 to terminal 1 is provided by antennas 5 and 6.

The equipment for communicating between terminals 1 and 2 in both directions includes well known telegraphic and radio communication equipment. More specifically there is shown in Fig. 1 in illustrative form that communication from terminals 1 and 2 is provided by transmitting station 1*a* including telegraph perforator 7 which at the command of a telegraph operator provides at the output thereof a perforated tape 8 including thereon the intelligence in the form of perforations having a configuration dictated by the telegraphic code. Perforated tape 8 is moved into telegraph transmitter 9 wherein the perforations on tape 8 are translated into energy representative of the coded intelligence on tape 8. The energy output of transmitter 9 is coupled to radio transmitter 10 to modulate a carrier signal prior to propagation from antenna 3 to antenna 4 and hence to receiving station 2*a* of terminal 2.

Perforated tape 8 is moved into telegraph transmitter 9 by means of a tape advancing mechanism 11 included as an integral part of transmitter 9 at a sufficient rate to enable the translation of the perforation on tape 8 to signal energy which may be utilized to modulate radio transmitter 10 in any well known manner. Tape advancing mechanism 11 may be any device to provide a controllable movement of tape 8 into transmitter 9. For instance, mechanism 11 may include a motor connected to a power supply, such as 110 v., 60-cycle power source, and a sprocket wheel driven by the motor to engage spaced peripheral apertures on perforated tape 8 for lineal movement thereof. Mechanism 11 may be arranged to reverse its direction for an instant when stopped so that an error will not be generated by stopping mechanism 11 in the middle of a telegraph character.

Receiving station 2*a* includes antenna 4 and radio receiver 12 to detect the intelligence carried by the carrier signal intercepted by antenna 4 in a well-known manner. In receiving station 2*a* of the present system, the detected telegraph energy is coupled to telegraph printer 13. Telegraph printer 13 may be any well-known type telegraph printer which, for instance, may include a tape perforator to perforate a tape in accordance with the code contained in the signal energy applied thereto and a device to translate the information on the perforated tape to a written message.

Communication from terminal 2 to terminal 1 is accomplished by employing identical equipment as described hereinabove but of course operating in the reverse direction. Transmission of signals from terminal 2 is accomplished by transmitting station 2*b* including telegraph perforator 14 providing at the output thereof perforated tape 15 to be advanced into telegraph transmitter 16 by tape advancing mechanism 17. Transmitter 16 converts the perforations on tape 15 into signal energy which modulates the carrier signal of radio transmitter 18. The modulated carrier signal is propagated from antenna 5 to antenna 6 of the receiving station 1*b* of terminal 1. The energy detected by antenna 6 is coupled to radio receiver 19 of receiving station 1*a* for the demodulation of the telegraph signals. The demodulated telegraph signals at the output of radio receiver 19 are coupled to telegraph printer 20 for conversion of the telegraph electrical energy into a printed page substantially as mentioned hereinabove with respect to printer 13 of receiving station 2*a*.

The components outlined hereinabove are the usual components employed in a radio telegraph communication system. It is with these usual system components that our error-reducing system operates to reduce the telegraph errors that will occur when the carrier signal experiences a deep fade in the communication path between antennas 3 and 4 or between antennas 5 and 6. It is of course recognized that these deep carrier signal fades may occur relatively frequently on over-the-horizon or forward scatter radio links. The carrier signal fades also may occur, but less frequently, on line-of-sight radio links and on land-line communication links.

Referring to Fig. 2, there is illustrated therein a graphical representation of what may occur in the communication paths between the terminals 1 and 2. As illustrated in Fig. 2 the carrier signal level will normally be relatively high with respect to the receiver threshold as represented by dotted line 21. Occasionally there will be experienced on communication paths a deep fade wherein the carrier signal level goes below the receiver threshold and hence the receiver in the communication path will not have sufficient carrier signal for correct intelligence demodulation. Since the telegraph transmitter is not normally aware of the loss of carrier signal at the receiver, the telegraph signal continues to be transmitted. Hence, during the period that the carrier signal is below the receiver threshold there will be a loss of characters or errors in the telegraph message. These deep fade periods, are illustrated in the drawing of Fig. 2, at 22, 22*a*, 22*b* and 22*c*. It will be noted that these carrier signal fades do not occur at a particular rate, but rather are random in nature, and hence each signal fade must be protected against independently of any other signal fade. It is the purpose of the telegraph error reducing system of this invention described hereinbelow to recognize when the signal is going into a period of deep fading and to notify the transmitting station that a carrier signal fade may be about to occur and hence it should not transmit any further telegraph signals. As soon as the carrier signal fade disappears, the transmitting station is then notified to continue transmission of the telegraph signals.

The telegraph error reducing system of this invention and its cooperation with the usual radio telegraph equipment for communication in one direction will now be described in detail. Let us assume that the one-way communication is being accomplished from terminal 2 to terminal 1 by transmitting station 2*b* and receiving station 1*b*. Receiving station 1*b* in addition to radio receiver 19 and telegraph printer 20 includes signal level detector 23 which is responsive to the amplitude of carrier signal received to produce a control signal when the carrier signal received at receiving station 1*b* drops below a given amplitude. This given amplitude is illustrated in Fig. 2 by line 24. Circuitry is provided which responds to the control signal produced by detector 23 to render telegraph transmitter 16 of transmitting station 2*b* inoperative during the period that the carrier signal is below the given amplitude represented by line 24 of Fig. 2.

More specifically the circuitry responsive to the control signal produced by detector 23 includes a relay 25 which holds switch 26 in a closed position permitting the pilot or monitoring signal $F_1$ to pass from the pilot tone generator 27 to transmitting station 2*b*. The output of pilot tone generator 27 could be coupled by means of a land-line or other transmission medium to transmitting station 2*b*. One such transmission medium is illustrated in Fig. 1 as the communication path for the other direction of the two-way communication system of Fig. 1. The pilot tone $F_1$ is, as illustrated, coupled by means of radio transmitter 10 of transmitting station 1*a* to receiver 12 of receiving station 2*a*. The detected output of radio receiver 12 includes the signal $F_1$ and is detected by filter 28. The output from filter 28 operates relay 29 to hold switch 30 in a closed position to maintain the tape advancing mechanism 17 in operation. If the tape advancing mechanism is the type outlined above, a motor is connected to a power supply through switch 30. When switch 30 is closed, the circuit is completed between the power supply and the motor to thereby maintain mechanism 17 in operation. Now let us assume that the carrier signal level starts to go into the fade identified in Fig. 2 at 22. Signal level detector 23 will recognize by the drop in signal level that the signal is going into a signal fade. As soon as the signal detected by detector 23 reaches the given level indicated by line 24 there is a control signal produced, that is, a decrease in the current required to operate relay 25 to hold switch 26 in a closed position. Therefore, switch 26 will open disconnecting the signal $F_1$ from transmitter 10. The loss of signal $F_1$ is recognized by filter 28 and produces no output therefrom. Relay 29 becomes deenergized and switch 30 opens. The opening of switch 30 stops the tape advancing mechanism so that the tape will no longer advance into transmitter 16 and hence the telegraph signals will stop being applied to radio transmitter 18 for modulation of the carrier signal thereof. Therefore, the system described hereinabove prevents the transmission of telegraph signals when the carrier signal level drops below a given amplitude which will thereby prevent the production of telegraph errors during deep carrier signal fades resulting in the carrier signal dropping below the receiver threshold, line 21, Fig. 2.

The rendering of telegraph transmitter 16 inoperative due to the carrier level signal fade does not stop the transmission of carrier signal from transmitter 18. Hence, as soon as the carrier signal, minus the telegraph modulation reaches the acceptable level as detected by detector 23 and as indicated by line 24, Fig. 2, relay 25 is energized by the output of detector 23 closing switch 26 and thereby coupling pilot tone generator 27 to radio transmitter 10. There again will be output from filter 28 to energize relay 29 to close switch 30 so that the tape advancing mechanism 17 can again go into operation to produce electrical telegraph signals for modulation of radio transmitter 18 and hence commence telegraph transmission again.

During that period of time which the tape advancing mechanism 17 is disconnected or inoperative, telegraph perforator 14 will still be perforating tape as the operator continues his function. The tape will be stored by merely allowing it to be accumulated on the floor, or if necessary in a bin, until such time as the tape advancing mechanism will be put back into operation and hence the telegraph transmission is again permitted. Thus, the operator of telegraph perforator 14 does not realize that the transmitter 16 is not transmitting and really doesn't care but continues to type out the message as fast as possible perforating the tape and allowing the tape to go into storage until such time as transmitter 16 is again put back into operation.

For sake of simplicity signal level detector 23 has been illustrated as a separate unit which would be connected to an appropriate point in radio receiver 19 to detect the level of the carrier signal or to detect the level of the intermediate frequency (IF) signal which would be proportional to the carrier signal to enable the determination of when the carrier signal drops below the given amplitude. It should be pointed out at this time that signal level detector 23 could be the automatic gain control (AGC) detector incorporated in most radio receivers. The D.-C. voltage coupled from the AGC detector to an appropriate IF amplifying stage would give an indication of the carrier signal level and hence this voltage could be used to control the operation of relay 25.

It should be pointed out that a fade on the communication path carrying pilot tone $F_1$, between antennas 3 and 4, will not upset the operation of this telegraph error reducing system. If a fade occurs on the path between antennas 3 and 4, at the worst the pilot tone will disappear and hence the telegraph transmitter 16 will be rendered inoperative by the loss of the pilot tone rather than by a deep fade of the signal going from transmitter 18 to receiver 19. Hence, with the present error reducing system the tape will be stored for the period that fades occur on the communication path for pilot tone $F_1$ as well as for fades on the communication path for the intelligence signal. This is not detrimental in the speed of the operation of the telegraph system since the telegraph systems very seldom operate at full capacity, that is, sixty words per minute 24 hours a day and hence the storage of the tape as will occur in the system of this invention can be removed from storage during the idle times of the telegraph perforator provided the carrier signal level is proper. On the average the speed of a telegraph system employing our invention may drop to 58 or 59 words per minute on the average rather than the usual 60 words per minute. This could not be considered to be a detrimental feature of this system, since by employing our system, it is possible to achieve with east the acceptable maximum error rate of 2 errors per hour. This error reduction is more preferable than maintaining the speed of the telegraph system at 60 words per minute.

Filter 28 is employed as a detector for signal $F_1$ since in addition to the function of detecting $F_1$ prevents noise from causing chattering of relay 29 and switch 30 when signal $F_1$ has been interrupted or lost.

The telegraph error reducing system of the present invention has been described with reference to the communication path for one direction in a two-way communication system. The schematic diagram of Fig. 1 illustrates the additional components that would be necessary to protect the communication path in the opposite direction from carrier signal fades. The components employed to reduce telegraph errors in the communication path from transmitting station 1*a* and receiving station 2*a* are identical with one exception to the components employed in the communication path from transmitting station 2*b* and receiving station 1*b*. The exception being that the frequency of the signal output of the pilot tone generator has a different value than the frequency of the pilot tone in the other communication path. Briefly, a pilot tone or monitoring signal having a frequency $F_2$ is coupled from pilot tone generator 31 to radio transmitter 18 and hence to radio receiver 19 wherein the monitoring signal at frequency $F_2$ is detected in filter 32 to maintain relay 33 energized to hold switch 34 closed thereby maintaining tape advancing mechanism 11 in operation and hence enable the modulation of the carrier signal of transmitter 10 by telegraph signals. The carrier signal transmitted from transmitting station **1*b* to receiving station 2*a* is detected in signal level detector 35 to determine when the carrier signal level is going into a fade condition. Detector 35 will provide a control signal proportional to the amplitude of the carrier signal level so that as the carrier signal level drops below a given amplitude, such as illustrated in line 24, Fig. 2, relay 36 is deenergized thereby opening switch 37 and hence disconnecting the pilot tone signal from the transmission medium from receiving station 2*a* and transmitting station 1*a*. Filter 32 will recognize this loss of pilot tone and hence with no output therefrom relay 33 will become deenergized and switch 34 will open to thereby stop the tape advancing mechanism 11. This renders telegraph transmitter 9 inoperative and hence there will be no loss of telegraph signals due to a carrier signal fade occurring on communication path between antennas 3 and 4**.

It will be noted that the output from signal level detector 23 and also the output from signal level detector 34 is coupled to a potentiometer 38 and 39, respectively. The purpose of potentiometers 38 and 39 is to permit the adjustment of the output amplitude of detectors 23 and 34 to enable a control of when relays 25 and 36 will be deenergized and hence the given signal level below which the telegraph transmission is stopped. It will be appreciated that to give the control loop time to operate, once a fade is detected, to shut off the telegraph transmitter before any of the characters were lost, it will be necessary to adjust the signal level to accommodate the steepness or quickness that the signal goes into fade. Hence if the signal fades, as illustrated by the steepness of line 40, the amplitude at which the control circuit must be put into operation is relatively high since the signal is fading relatively quick. Thus, the given amplitude of the signal must be set relatively high to cause the relays to respond sooner to stop telegraph transmission before the received signal completely disappears below receiver threshold. If transmission is not shut down before the received signal goes below the receiver threshold, there will be an error since signals were lost in this fade region. Under these circumstances the potentiometers would be adjusted so that the movable arm is moved close to ground. This reduces the percentage of the voltage and hence current coupled to the relay from the detectors so that a small decrease in signal level will cause relays to become energized. However, if these carrier signals fade as illustrated by lines 41 or 42 it would be apparent that the given level below which the system of this invention responds can be brought closer to the receiver threshold than is possible when the signal faded along the path described by line 40. This is due to the fact that the slow rate at which the signal approaches a fade gives the system a longer time to act and, hence, the signal level at which the system of this invention is placed into operation may be brought closer to the actual receiver threshold. Under these circumstances, the movable arms of potentiometers 38 and 39 would be moved away from ground so that a larger percent of the voltage and hence more current is applied to the associated relay from the associated detectors, thereby requiring a large decrease in signal level before relays will become energized.

While we have described above the principles of our invention in connection with specific apparatus, it is to be clearly understood that this description is made only by way of example and not as a limitation to the scope of our invention as set forth in the objects thereof and in the accompanying claims.

We claim:

1. A telegraph error reducing system comprising a signal receiving station, a signal transmitting station including a carrier signal generator and a signal source modulating said generator, means disposed in said receiving station responsive to carrier signal received from said transmitting station to produce a control signal when the amplitude of said received carrier signal drops below a given amplitude, means to couple said control signal to said transmitting station, and means disposed in said transmitting station responsive to said control signal to render said signal source inoperative during that period of time said received carrier signal is below said given amplitude.

2. A telegraph error reducing system comprising a signal receiving station, a signal transmitting station including a carrier signal generator and a telegraph transmitting means modulating said generator, means disposed in said receiving station responsive to carrier signal received from said transmitting station to produce a control signal indicative of the amplitude and said received carrier signal, means to couple said control signal to said transmitting station, and means disposed in said transmitting station responsive to said control signal to maintain said telegraph transmitting means in operation when the amplitude of said control signal is above a given value and to cut off said telegraph transmitting means when the amplitude of said control signal is said given value.

3. A telegraph error reducing system comprising a signal receiving station, a signal transmitting station including a radio transmitter and a telegraph transmitting means modulating said radio transmitter, means disposed in said receiving station responsive to carrier signal received from said radio transmitter to produce a control signal indicative of the amplitude of said received carrier signal, means to couple said control signal to said transmitting station, and means disposed in said transmitting station responsive to said control signal to maintain said telegraph transmitting means in operation when the amplitude of said control signal is above a given value and to cut off said telegraph transmitting means when the amplitude of said control signal is said given value.

4. A telegraph error reducing system comprising a signal transmitting station including a radio transmitter for transmitting a carrier signal and a telegraph transmitter coupled to said radio transmitter to modulate said carrier signal with telegraph signals, a signal receiving station including a radio receiver having a given receiver threshold for receiving signals transmitted from said radio transmitter, means coupled to said radio receiver responsive to said carrier signal received by said radio receiver to produce a control signal having a first value when the amplitude of said received carrier signal is above said receiver threshold a given amount and a second value when the amplitude of said received carrier signal approaches said receiver threshold below said given amount, means to couple said control signal to said transmitting station, and means disposed in said transmitting station responsive to said control signal to maintain said telegraph transmitter in operation when said control signal has said first value and to cut off said telegraph transmitter when said control signal has said second value.

5. A telegraph error reducing system comprising a signal transmitting station including a radio transmitter and a telegraph transmitter modulating said radio transmitter, a signal receiving station including a radio receiver having a given threshold for receiving energy from said radio transmitter, means coupled to said radio receiver responsive to carrier signal received from said radio transmitter to produce a control signal when the amplitude of said received carrier signal drops below a given amplitude, said given amplitude being greater than said receiver threshold by a predetermined amount, means to couple said control signal to said transmitting station, and means disposed in said transmitting station responsive to said control signal to render said telegraph transmitter inoperative during that period of time said received carrier signal is below said given amplitude.

6. A telegraph error reducing system comprising a pair of stations, the first of said stations having means for transmitting carrier signal toward the second of said stations and means for modulating said carrier signal with intelligence signals, said second of said stations having means for receiving said carrier signal and said intelligence signals and means responsive to said carrier signal for sending a monitoring signal back to said first station, said first station having means responsive to said monitoring signal for maintaining said modulating means in operation and for cutting off said modulating means in the absence of said monitoring signal.

7. A telegraph error reducing system comprising a pair of stations, the first of said stations having means for transmitting a carrier signal toward the second of said stations and means for modulating said carrier signals with telegraph signals, said second of said stations having means for receiving said carrier signal and means responsive to the ampliude of said carrier signal for sending a monitoring signal back to said first station, said first station having means responsive to said monitoring signal for maintaining said modulating means in operation and for cutting off said modulating means in the absence of said monitoring signal.

8. A telegraph error reducing system comprising a signal transmitting station including a radio transmitter for transmitting a carrier signal and a telegraph transmitter coupled to said radio transmitter for modulating said carrier signal with telegraph signals, a signal receiving station including a radio receiver for receiving said carrier signal transmitted from said radio transmitter and a signal generator for generating a monitoring signal having a given frequency, means coupling the signal of said signal generator to said transmitting station, means included in said transmitting station detecting said monitoring signal and means coupled to the output of said monitoring signal detector means to maintain said telegraph transmitter operative as long as an output is delivered from said monitoring signal detector means, and means included in said receiving station coupled to said radio receiver to detect the amplitude of said carrier signal, said carrier signal detector means rendering said signal generator inoperative when the carrier signal level falls below a given amplitude to thereby render said telegraph transmitter inoperative.

9. A telegraph error reducing system comprising a signal transmitting station including a radio transmitter for transmitting a carrier signal and a telegraph transmitter coupled to said radio transmitter for modulating said carrier signal with telegraph signals, a receiving station including a radio receiver for receiving said carrier signal transmitted from said radio transmitter and a signal generator for generating a monitoring signal having a given frequency, radio communication means coupling the signal of said signal generator to said transmitting station, means included in said transmitting station detecting said monitoring signal and means coupled to the output of said monitoring signal detector means to maintain said telegraph transmitter operative as long as an output is delivered from said monitoring signal detector means, and means included in said receiving station coupled to said radio receiver to detect the amplitude of said carrier signal, said carrier signal detector means rendering said signal generator inoperative when the carrier signal level falls below a given amplitude to thereby render said telegraph transmitter inoperative.

10. A telegraph error reducing system comprising a signal transmitting station including a first radio transmitter for transmitting a carrier signal and a telegraph transmitter coupled to said first radio transmitter for modulating said carrier signal with telegraph signals, a receiving station including a first radio receiver for receiving said carrier signal transmitted from said first radio transmitter and a signal generator for generating a monitoring signal having a given frequency, a second radio transmitter included in said receiving station, means coupling said monitoring signal to said second radio transmitter for transmission to said transmitting station, a second radio receiver included in said transmitting station to receive said monitoring signal transmitted from said receiving station, means included in said transmitting station coupled to the output of said second radio receiver for detecting said monitoring signal and means coupled to the output of said monitoring signal detector means to maintain said telegraph transmitter operative as long as an output is delivered from said monitoring signal detector means, and means included in said receiving station coupled to said first radio receiver to detect the amplitude of said carrier signal, said carrier signal detector means rendering said signal generator inoperative when the carrier signal level falls below a given amplitude to thereby render said telegraph transmitter inoperative.

11. A telegraph error reducing system comprising a signal transmitting station including a radio transmitter for transmitting a carrier signal, means to transfer intelligence to a tape in the form of perforations therein arranged in accordance with a given telegraphic code, a telegraph transmitter coupled to said tape perforating means to convert the perforations of said tape to electrical telegraph signals, said telegraph transmitter including a tape advancing mechanism to feed said tape into said telegraph transmitter, and means coupling the output of said telegraph transmitter to said radio transmitter to modulate said carrier signal with said telegraph signals, a receiving station including a radio receiver for receiving said carrier signal transmitted from said radio transmitter and a signal generator for generating a monitoring signal having a given frequency, means coupling the signal of said signal generator to said transmitting station, means included in said transmitting station detecting said monitoring signal and means coupled to the output of said monitoring signal detector means to maintain said tape advancing mechanism operative as long as an output is delivered from said monitoring signal detector means, and means included in said receiving station coupled to said radio receiver to detect the amplitude of said carrier signal, said carrier signal detector means rendering said signal generator inoperative when the carrier signal level falls below a given amplitude to thereby render said tape advancing mechanism inoperative.

12. A telegraph error reducing system comprising a signal transmitting station including a radio transmitter for transmitting a carrier signal, means to transfer intelligence to a tape in the form of perforations therein arranged in accordance with a given telegraphic code, a telegraph transmitter coupled to said tape perforating means to convert the perforations of said tape to electrical telegraph signals, said telegraph transmitter including a tape advancing mechanism to feed said tape into said telegraph transmitter, and means coupling the output of said telegraph transmitter to said radio transmitter to modulate said carrier signal with said telegraph signals, a receiving station including a radio receiver for receiving said carrier signal transmitted from said radio transmitter and a signal generator for generating a monitoring signal having a given frequency, radio communication means coupling the signal of said signal generator to said transmitting station, means included in said transmitting station detecting said monitoring signal and means coupled to the output of said monitoring signal detector means to maintain said tape advancing mechanism operative as long as an output is delivered from said monitoring signal detector means, and means included in said receiving station coupled to said radio receiver to detect the amplitude of said carrier signal, said carrier signal detector means rendering said signal generator inoperative when the carrier signal level falls below a given amplitude to thereby render said tape advancing mechanism inoperative.

13. A telegraph error reducing system comprising a signal transmitting station including a first radio transmitter for transmitting a carrier signal, means to transfer intelligence to a tape in the form of perforations therein arranged in accordance with a given telegraphic code, a telegraph transmitter coupled to said tape perforating means to convert the perforations of said tape to electrical telegraph signals, said telegraph transmitter including a tape advancing mechanism to feed said tape into said telegraph transmitter, and means coupling the output of said telegraph transmitter to said first radio transmitter to modulate said carrier signal with said telegraph signals, a receiving station including a first radio receiver for receiving said carrier signal transmitted from said first radio transmitter and a signal generator for generating a monitoring signal having a given frequency, a second radio transmitter included in said receiving station, means coupling said monitoring signal to said second radio transmitter for transmission to said transmitting station, a second radio receiver included in said transmitting station to receive said monitoring signal transmitted from said receiving station, means included in said transmitting station coupled to the output of said second radio receiver for detecting said monitoring signal and means coupled to the output of said monitoring signal detector means to maintain said telegraph transmitter operative as long as an output is delivered from said monitoring signal detector means, and means included in said receiving station coupled to said first radio receiver to detect the amplitude of said carrier signal, said carrier signal detector means rendering said signal generator inoperative when the carrier signal level falls below a given amplitude to thereby render said tape advancing mechanism inoperative.

14. A telegraph error reducing system comprising a pair of stations disposed at opposite ends of an over-the-horizon communication system, the first of said stations having means for transmitting a carrier signal toward the second of said stations and means for modulating said carrier signal with intelligence, said second of said stations having means for receiving said carrier signal and means responsive to the amplitude of said received carrier signal for controlling the transmission of a monitoring signal back to said first station, said first station having means responsive to said monitoring signal for maintaining said modulating means in operation and for cutting off said modulating means in the absence of said monitoring signal.

15. A telegraph error reducing system comprising a signal transmitting station and a signal receiving station disposed at opposite ends of an over-the-horizon communication system, said signal transmitting station including a radio transmitter for transmitting a carrier signal and a telegraph transmitter coupled to said radio transmitter for modulating said carrier signal with telegraph signals, said signal receiving station including a radio receiver for receiving the carrier signal transmitted from said radio transmitter and a signal generator for generating a monitoring signal having a given frequency, means coupling the signal of said signal generator to said transmitting station, means included in said transmitting station detecting said monitoring signal and means coupled to the output of said monitoring signal detector means to maintain said telegraph transmitter operative as long as an output is delivered from said monitoring signal detector means, and means included in said receiving station coupled to said radio receiver to detect the amplitude of said carrier signal, said carrier signal detector means rendering said signal generator inoperative when the carrier signal level falls below a given amplitude to thereby render said telegraph transmitter inoperative.

16. A telegraph error reducing system comprising a signal transmitting station and a signal receiving station disposed at opposite ends of an over-the-horizon communication system, said signal transmitting station including a first radio transmitter for transmitting a carrier signal, means to transfer intelligence to a tape in the form of perforations therein arranged in accordance with a given telegraphic code, a telegraph transmitter coupled to said tape perforating means to convert the perforations of said tape to electrical telegraph signals, said telegraph transmitter including a tape advancing mechanism to feed said tape into said telegraph transmitter, and means coupling the output of said telegraph transmitter to said first radio transmitter to modulate said carrier signal with said telegraph signals, said receiving station including a first radio receiver for receiving said carrier signal transmitted from said first radio transmitter and a signal generator for generating a monitoring signal having a given frequency, a second radio transmitter included in said receiving station, means coupling said monitoring signal to said second radio transmitter for transmission to said transmitting station, a second radio receiver included in said transmitting station to receive said monitoring signal transmitted from said receiving station, means included in said transmitting station coupled to the output of said second radio receiver for detecting said monitoring signal and means coupled to the output of said monitoring signal detector means to maintain said telegraph transmitter operative as long as an output is delivered from said monitoring signal detector means, and means included in said receiving station coupled to said first radio receiver to detect the amplitude of said carrier signal, said carrier signal detector means rendering said signal generator inoperative when the carrier signal level falls below a given amplitude to thereby render said tape advancing mechanism inoperative.

17. A telegraph error reducing system comprising a first transmitter station and a first receiving station to provide a first communication path in one direction, a second transmitting station and a second receiving station to provide a second communication path in a direction opposite to said one direction, each of said transmitting stations including means for transmitting a carrier signal along its associated communication path and means for modulating said carrier signal with intelligence signals, each of said receiving stations including means for receiving said carrier signal from its associated communication path, means included in at least one of said receiving stations responsive to the amplitude of the carrier signal present on its associated communication path for controlling the transmission of a monitoring signal back to the transmitting station associated with said one of said receiving stations along the other of said communication paths, said transmitting station associated with said one of said receiving stations including means responsive to said monitoring signal for maintaining said modulating means included therein in operation and for cutting off said modulating means included therein in the absence of said monitoring signal.

18. A telegraph error reducing system comprising a first transmitting station and a first receiving station to provide a first communication path in one direction, a second transmitting station and a second receiving station to provide a second communication path in a direction opposite to said one direction, each of said transmitting stations including means for transmitting a carrier signal along its associated communication path and means to modulate said carrier signal with intelligence signals, each of said receiving stations including means for receiving said carrier signal from its associated communication path and means responsive to the amplitude of the carrier signal present on its associated communication path for controlling the transmission of a monitoring signal back to the transmitting station associated with said receiving stations along the communication path other than its associated communication path, each of said transmitting stations including means responsive to said monitoring signal controlled by its associated receiving station for maintaining said modulating means included therein in operation and for cutting off said modulating means included therein in the absence of said monitoring signal.

19. A telegraph error reducing system comprising a first signal transmitting station including a radio transmitter for transmitting a carrier signal and a telegraph transmitter coupled to the radio transmitter for modulating said carrier signal with telegraph signals, a first signal receiving station including a radio receiver for receiving said carrier signal transmitted from said first transmitting station and a signal generator for generating a monitoring signal having a first given frequency, said first transmitting and receiving stations defining a first communication path in one direction, a second signal transmitting station including a radio transmitter for transmitting a carrier signal and a telegraph transmitter coupled to said radio transmitter for modulating said carrier signal with telegraph signals, a second signal receiving station including a radio for receiving said carrier signal transmitted from said second transmitting station and a signal generator for generating a monitoring signal having a second given frequency, said second transmitting and receiving stations defining a communication path having a direction opposite to said one direction, means coupling said monitoring signal having said first given frequency to said second transmitting station for transmission to said second receiving station, first means included in said second receiving station for detecting said monitoring signal having said first given frequency and means coupled to the output of said first monitoring signal detector means to maintain said telegraph transmitter of said first transmitting station operative as long as an output is delivered from said monitoring signal detector means, first means included in said first receiving station coupled to said radio receiver to detect the amplitude of said carrier signal transmitted from said first transmitting station, said first carrier signal detector means rendering said signal generator for generating said monitoring signal of said first given frequency inoperative when the signal level of the carrier signal of said first transmitting station falls below a given amplitude to thereby render said telegraph transmitter of said first transmitting station inoperative, means coupling said monitoring signal having said second given frequency to the transmitting station to said first transmitting station to transmit the monitoring signal of said second given frequency to said first receiving station, second means included in said first receiving station for detecting said monitoring signal having said second given frequency and means coupled to the output of said second monitoring signal detector means to maintain said telegraph transmitter of said second transmitting station operative as long as an output is delivered from said monitoring signal detector means, and second means included in said second receiving station coupled to said radio receiver to detect the amplitude of said carrier signal transmitted from said second transmitting station, said second carrier signal detector means rendering said signal generator for generating said monitoring signal having second given frequency inoperative when the signal level of the carrier signal of said second transmitting station falls below a given amplitude to thereby render said telegraph transmitter of said second transmitting station inoperative.

20. A telegraph error reducing system comprising a first signal transmitting station including a radio transmitter for transmitting a carrier signal, means to transfer intelligence to a tape in the form of perforations therein arranged in accordance with a given telegraphic code, a telegraph transmitter coupled to said tape perforating means to convert the perforations of said tape to electrical telegraph signals, said telegraph transmitter including a tape advancing mechanism to feed said tape into said telegraph transmitter, and means coupling the output of said telegraph transmitter to said radio transmitter to modulate said carrier signal with said telegraph signals, a first signal receiving station including a radio receiver for receiving said carrier signal transmitted from said first transmitting station and a signal generator for generating a monitoring signal having a first given frequency, said first transmitting and receiving stations defining a first communication path in one direction, a second signal transmitting station including a radio transmitter for transmitting a carrier signal, means to transfer intelligence to a tape in the form of perforations therein arranged in accordance with a given telegraphic code, a telegraph transmitter coupled to said perforating means to convert the perforations of said tape to electrical telegraph signals, said telegraph transmitter including a tape advancing mechanism to feed said tape into said telegraph transmitter, and means coupling the output of said telegraph transmitter to said radio transmitter to modulate said carrier signal with said telegraph signals, a second signal receiving station including a radio receiver for receiving said carrier signal transmitted from said second transmitting station and a signal generator for generating a monitoring signal having a second given frequency, said second transmitting and receiving stations defining a communication path having a direction opposite to said one direction, means coupling said monitoring signal having said first given frequency to said second transmitting station for transmission to said second receiving station, first means included in said second receiving station for detecting said monitoring signal having said first given frequency and means coupled to the output of said first monitoring signal detector means to maintain said tape advancing mechanism of said first transmitting station operative as long as an output is delivered from said monitoring signal detector means, first means included in said first receiving station coupled to said radio receiver to detect the amplitude of said carrier signal transmitted from said first transmitting station, said first carrier signal detector means rendering said signal generator for generating said monitoring signal of said first given frequency inoperative when the signal level of the carrier signal of said first transmitting station falls below a given amplitude to thereby render said tape advancing mechanism of said first transmitting station inoperative, means coupling said monitoring signal having said second given frequency to the transmitting station to said first transmitting station to transmit the monitoring signal of said second given frequency to said first receiving station, second means included in said first receiving station for detecting said monitoring signal having said second given frequency and means coupled to the output of said second monitoring signal detector means to maintain said tape advancing mechanism of said second transmitting station operative as long as an output is delivered from said monitoring signal detector means, and second means included in said second receiving station coupled to said radio receiver to detect the amplitude of said carrier signal transmitted from said second transmitting station, said second carrier signal detector means rendering said signal generator for generating said monitoring signal having said given frequency inoperative when the signal level of the carrier signal of said second transmitting station falls below a given amplitude to thereby render said tape advancing mechanism of said second transmitting station inoperative.

References Cited in the file of this patent

UNITED STATES PATENTS

| | | |
|---|---|---|
| 1,723,220 | Thorp | Aug. 6, 1929 |
| 1,749,048 | Thorp et al. | Mar. 4, 1930 |